United States Patent [19]
Kim et al.

[11] Patent Number: 5,263,100
[45] Date of Patent: Nov. 16, 1993

[54] IMAGE CODING METHOD AND APPARATUS

[75] Inventors: Jong-kuk Kim, Daegu; Min-seok Hong; Tae-eung Kim, both of Seoul, all of Rep. of Korea

[73] Assignee: Samsung Electronics Co., Ltd., Rep. of Korea

[21] Appl. No.: 915,501

[22] Filed: Jul. 20, 1992

[30] Foreign Application Priority Data

Jul. 19, 1991 [KR] Rep. of Korea .................... 91-12412
Jun. 15, 1992 [KR] Rep. of Korea .................... 92-10377

[51] Int. Cl.⁵ .............................................. G06K 9/36
[52] U.S. Cl. .................... 382/56; 358/261.2; 358/433; 382/50
[58] Field of Search ...................... 382/56, 50, 41, 51; 258/133, 426, 261.2, 261.3, 433

[56] References Cited

U.S. PATENT DOCUMENTS

| | | | |
|---|---|---|---|
| 5,020,121 | 5/1991 | Rosonberg | 382/56 |
| 5,054,103 | 10/1991 | Yasuda et al. | 358/261.2 |
| 5,121,216 | 6/1992 | Chen et al. | 358/433 |
| 5,166,987 | 11/1992 | Kayeyama | 382/56 |

*Primary Examiner*—Joseph Mancuso
*Attorney, Agent, or Firm*—Sughrue, Mion, Zinn Macpeak & Seas

[57] ABSTRACT

In an image coding system for coding a digital image signal sequence into a coded signal sequence and transmitting an amount of information of the coded signal at a fixed bit rate, an image coding method for coding the image signal sequence includes the steps of setting an initial quantization step size by calculation of frame information measures (PIM) with respect to an image signal sequence for each frame, segmenting the image signal sequence of each frame into a block signal sequence including a plurality of N×N blocks, obtaining an allocated number of bits for each block to be coded with respect to the fixed bit rate by calculation of block PIM for each block of the block signal sequence, coding the block signal sequence for each block into a coded signal sequence according to a quantization step size currently set, subtracting the number of bits in the coded signal sequence for each block from the allocated bit number, and accumulating the differences, and adjusting the quantization step size currently set when the differences accumulated deviate from a previously set range. An image coding apparatus suitable for implementing the method is disclosed. According to one aspect of the disclosed method, since the number of bits are fixed by calculating PIM, the bit amount can be accurately calculated.

18 Claims, 5 Drawing Sheets

Y — 90x60 BLOCKS

FIG. 5B

R−Y — 45x60 BLOCKS

FIG. 5C

B−Y — 45x60 BLOCKS

FIG. 6

IMAGE CODING METHOD AND APPARATUS

FIELD OF THE INVENTION

The present invention relates to an image coding method and, more particularly, to an image coding method for fixing the amounts of coded signal information. An apparatus advantageously suited for carrying out the image coding method is also disclosed.

BACKGROUND OF THE INVENTION

In order to code an image signal sequence into a coded signal sequence and to reduce the transmitted amount of information of the coded signal sequence, several coding algorithms including a predictive coding system, an orthogonal coding system, and a vector quantization system can be employed in a conventional image coding system. The coded signal sequence is transmitted to a corresponding decoding system through either a transmission line or a transmission path.

In a digital magnetic recording and playback system, the coded signal sequence is recorded onto a magnetic tape using one or more magnetic heads. In order to transmit and record the coded signal sequence with a high efficiency, the amount of information of the coded signal sequence must be controlled. This is especially true in the digital magnetic recording and playback system, since the number of bits corresponding to a predetermined recording unit, e.g., a track or sync block, has to be constantly controlled in order to carry out trick play functions, such as high speed searching of the magnetic tape.

Examples of recording and reproducing techniques for digital VCR are found in the following articles, which are incorporated herein by reference:

"A Study on Trick Plays for Digital VCR," by Yamamitsu et al., THPM 13.2, pp 184–185, IEEE 1991.

"An Experimental Study for a Home-Use Digital VTR," by Yamamitsu et al., IEEE Transactions on Consumer Electronics, Vol. 35, No. 3, Aug. 1989.

"Rate-Constrained Optimal Block-Adaptive Coding for Digital Tape Recording of HDTV," by Wu and Gersho, IEEE Transactions on Circuits & Systems for Video Technology, Vol. 1, No. 1, March 1991 (pp 100–101).

"Adaptive DCT Coding for Home Digital VTR," by Dol et al., GLOBECOM 1988, pp. 1073–1079.

U.S. Pat. No. 4,920,426 discloses a coding system wherein a histogram of discrete cosine transform (DCT) coefficients is obtained, an amount of information is calculated from the obtained histogram, and then DCT coefficients are quantized by selecting one among a plurality of quantization characteristics in response to the calculated values. However, since an estimated number corresponding to the information amount is determined for each block, the total amount of information in one frame of an image signal cannot be predicted during the initial coding stage. In addition, since the amount of information of the coded signal is not fed back, precise calculations of the information amount is difficult. Moreover, when the amount of information in the coded signal exceeds a set transmission rate, data loss is large due to the discarding of excess data. This, of course, results in degradation of the quality of a reproduced image signal.

SUMMARY OF THE INVENTION

The present invention was motivated by a desire to solve the above-described problems of the conventional coding techniques.

It is the principle object of the present invention to provide an image coding method which overcomes the problems associated with conventional coding methods by using a calculation method based on picture information measures (PIM) for determining the information amount.

Another object of the present invention is to provide an image coding apparatus suitable for implementing the image coding method.

These and other objects, features and advantages of the present invention are provided in an image coding system by an image coding method for coding an image signal sequence by coding a digital image signal sequence into a coded signal sequence and then transmitting the amount of information of the coded signal sequence at a fixed bit rate. The method according to the present invention includes the steps of:

setting an initial quantization step size by calculation of PIM of each frame with respect to an image signal sequence for each picture;

segmenting the image signal sequence of each picture into a signal sequence including a plurality of $N \times N$ blocks to produce a block signal sequence;

obtaining an allocated bit number for each $N \times N$ block to be coded with respect to the fixed bit rate by calculation of block PIM for each $N \times N$ block of the block signal sequence;

coding the block signal sequence for each block into a coded signal sequence according to the quantization step size currently set to produce a coded signal sequence;

subtracting bit numbers of the coded signal sequence for each $N \times N$ block by the allocated bit number and accumulating the differences; and adjusting the quantization step size currently set when the differences accumulated deviate from a previously set range.

These and other objects, features and advantages of the present invention are provided by an image coding apparatus including:

input means for receiving a digital color image signal and generating a luminance component and color difference components;

sub-sampling means for sub-sampling the color difference components to produce sampled color difference components having predetermined sizes with respect to the luminance component;

block dividing means for segmenting each of the luminance component and the sampled color difference components, sequentially producing segmented block units in a block signal sequence, and generating a first control signal for indicating whether current output data of the block signal sequence is the luminance component or one of the color difference components, and a second control signal for indicating end-of-data with respect to one frame;

converting means receiving the block signal sequence from the block dividing means for generating transform coefficients obtained by performing discrete cosine transformation based on the block signal sequence:

quantization means for quantizing the transform coefficients based on a quantization step derived by multiplying a quantization matrix by predetermined scale factors, and for generating quantization coefficients;

encoding means for entropy coding the quantization coefficients using variable length Huffman coding and for generating compressed data wherein the number of bits thereof vary for each of the segmented block units;

setting means for determining scale factors including an initial scale factor corresponding to overall activity of one frame by calculating PIM(f) of the luminance component generated by the input means;

block bit determining means for receiving the segmented block units from the block dividing means and for producing an allocated number of coded bits which number corresponds to the activity in each of the segmented block units by calculating PIM(bi) for each of the segmented block units; and bit rate controlling means for accumulating differences between the allocated number of coded bits and the number of actually output bits, comparing the differences accumulated with threshold values, and minutely controlling the scale factors of the setting means to allow the number of actually output bits to converge on the allocated number of coded bits.

BRIEF DESCRIPTION OF THE DRAWINGS

The objects and features of the present invention will become more readily apparent from the following detailed description of the preferred embodiments taken in conjunction with the accompanying drawings, in which.

FIG. is a flowchart for illustrating an image coding method according to the present invention.

DETAILED DESCRIPTION OF PREFERRED EMBODIMENTS

Prior to discussing the preferred embodiments of the present invention, a brief discussion of picture information measures (PIM) employed in the present invention will be described to aid in the understanding of the present invention. PIM is a measurement denoting the amount of information included within a picture and is based upon the minimum number of gray level changes required to convert the respective gray levels of all pixels within a picture to a constant gray level.

Given that the number of pixels at gray level "i" can be denoted h(i), a histogram of a frame (f) can be represented as follows:

h: {0, 1, . . . ,L-1}→N

Therefore, the value PIM(f) for the frame f is defined as:

$$PIM(f) = \sum_{i=0}^{L-1} \{h(i) - \max h(i)\} \quad (1)$$

It should be noted that if the gray levels of all pixels in a frame f have the same value, then it can be said that PIM(f)=0. In addition, if frame f has a uniform histogram at all gray levels, PIM(f) is said to be a maximum. In other words, PIM(f) is a minimum value when frame f is the least informative, and PIM(f) becomes a maximum value when frame f is the most informative. It will be appreciated in the discussion that follows that PIM represents the value of information contained within a picture or frame of an image.

Assuming that frame f is composed of a pixel set s and that the pixel set s can be divided into two disjoint subsets $s_1$ and $s_2$, the PIM for each subset can be written as follows:

$$PIM(f/s) \geq PIM(f/s_1) + PIM(f/s_2) \quad (2)$$

Thus, the sum $PIM(f/s_i)$ of each of the subsets ($s_i$) of frame f is always less than or equal to PIM(f). In addition, the normalized PIM (NPIM(f)) can be defined by the expression:

$$NPIM(f) = PIM(f)/N(f) \quad (3)$$

where N(f) is the total number of pixels in frame f.

A more detailed description of PIM is presented in the work entitled "Principles of Pictorial Information Systems Design" by S. K. Chang (Prentice-Hall, 1989), which is incorporated herein by reference.

With this discussion in mind, a detailed discussion of the preferred embodiments of the method and apparatus according to the present invention will now be presented while referring to FIGS. 1-6.

Figure 1:
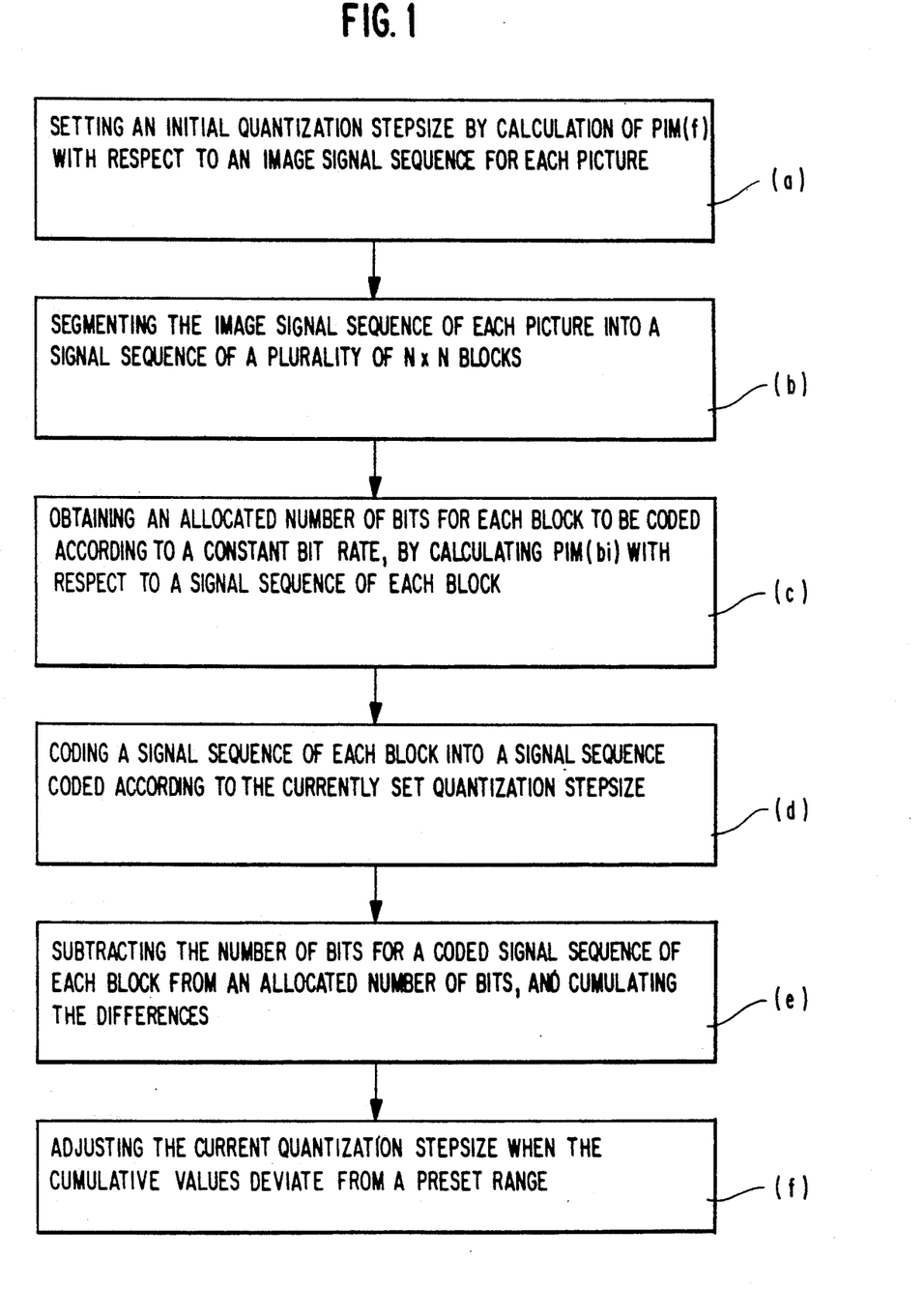

FIG. 1 shows a flowchart of an image coding method according to the present invention. During Step (a), an initial quantization step size is set by calculation of PIM(f) for an image signal sequence with respect to each picture. In other words, the initial quantization step is determined by calculating the amount of information in accordance with activity of the overall picture. During Step (b), the image signal sequence for each picture is segmented into a block signal sequence corresponding to a plurality of N×N blocks.

During Step (c), the allocated number of bits for each block to be coded, with respect to a fixed bit rate, is obtained by calculation of the PIM(bi) with respect to the block signal sequence corresponding to each block. Preferably, the information amount for each block is calculated, which corresponds to the activity of each block. Next, during Step (d), the block signal sequence for all blocks is coded into a coded signal sequence. The coded signal sequence is advantageously coded according to the currently set quantization step size.

After the coded signal sequence is generated during Step (d), the number of bits of the coded signal sequence corresponding to each block is subtracted from the allocated number of bits, and each difference is accumulated during Step (e).

If the accumulated values from Step (e) deviate from a previously set range, the current quantization step size is adjusted during Step (f). In other words, by repeatedly analyzing the coded bit rate in the course of the coding process, the current quantization step size can be minutely adjusted to allow the final bit rate to converge on the desired bit rate.

A preferred embodiment of the image coding method according to the present invention will now be described in greater detail.

Step (a) is for transforming coordinates and sub-sampling of color components of a digitized video signal. During this step, a R, G and B component signal sequence for a frame f is sub-sampled into the component signal sequence including luminance signal Y, and color difference signals R-Y and B-Y, which difference signals are compressed at a ratio of 2:1. Then, the component signal sequence Y:R-Y:B-Y is converted to produce a component signal ratio of 4:2:2. This signal processing sequence is described in greater detail below.

Step (b) is for setting an initial scale factor $S_i$ or quantization step size. Here, PIM(f) with respect to one frame of the Y component signal sequence is obtained, and the normalized PIM (NPIM(f)) is obtained by dividing the obtained PIM(f) by a total number of pixels N. Since NPIM(f) corresponds to the amount of information in the picture, the initial scale factor $S_1$ is obtained according to the expression:

$$S_i = C \times NPIM(f) \quad (4)$$

where C is a proportionality constant. Thus, the initial scale factor $S_i$ advantageously is determined in accordance with the complexity of the image.

Step (c) is for dividing the image signal sequence into blocks. During step (c), the image signal sequence formed by the Y, R-Y and B-Y component signal sequence with the ratio of 4:2:2 is segmented into a plurality of N×N blocks.

Step (d) is for calculating the number of allocated bits per block, wherein PIM(bi) with respect to the image signal sequence for each block is obtained.

Figure 2:
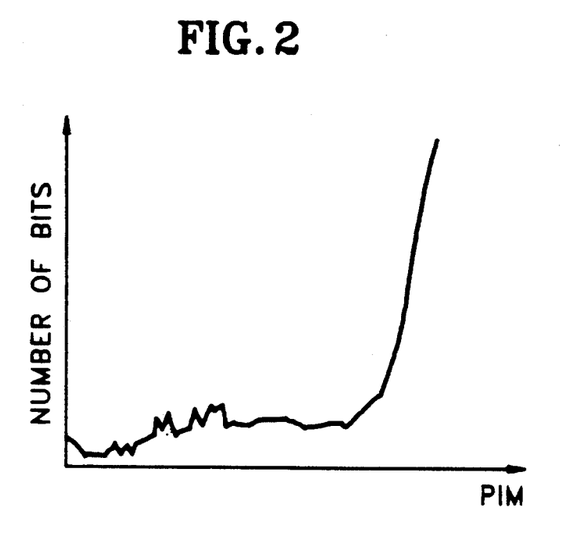
FIG. 2 is a graphical representation showing the relation between picture information measures (PIM) and the number of bits.

Referring to FIG. 2, a graphical representation indicating the relationship between PIM and the number of bits is shown. As shown in FIG. 2, PIM and the number of bits are not linearly proportional to one another. Accordingly, the bits are allocated by weighting each pixel of each of the N×N blocks for a more accurate bit allocation. In this manner, a PIM matrix can be formed to make the relation between PIM and the number of bits linear. The PIM matrix is calculated from experimental data obtained from various standard images as well as actually photographed images. An exemplary PIM matrix is shown in Table 1.

TABLE 1

| ARRANGEMENT OF PIM WEIGHTING VALUES | | | | | | | |
|---|---|---|---|---|---|---|---|
| 7,000 | 7,000 | 7,000 | 7,000 | 7,000 | 7,000 | 7,000 | 7,000 |
| 7,000 | 7,000 | 7,000 | 7,000 | 7,000 | 7,000 | 7,000 | 69,400 |
| 29,111 | 47,166 | 7,571 | 56,571 | 56,428 | 46,625 | 50,625 | 7,428 |
| 7,500 | 7,363 | 55,733 | 7,500 | 27,000 | 7,111 | 8,200 | 21,086 |
| 22,619 | 8,250 | 8,315 | 8,228 | 9,000 | 9,500 | 8,535 | 8,757 |
| 9,259 | 8,583 | 8,863 | 9,337 | 10,491 | 10,897 | 10,537 | 10,781 |
| 10,879 | 11,602 | 12,547 | 13,735 | 16,839 | 21,198 | 28,652 | 34,174 |
| 41,389 | 49,189 | 57,442 | 71,439 | 88,828 | 108,907 | 125,405 | 0,000 |

It will be appreciated that a separate PIM matrix can be provided with respect to each component Y, R-Y and B-Y of the video signal.

The value of total PIM(b) with respect to one frame f is obtained by summing the total PIM(bi) according to the expression:

$$TPIM(b) = \sum_{i=0}^{n-1} PIM(bi) \quad (5)$$

From equation (5) it will be apparent that PIM(bi)/TPIM(b) can be used to represent the activity for each block. Thus, an allocated bit number B(bi) for each block can be determined from the expression:

$$B(bi) = TB \times [PIM(bi)/TPIM(b)] \quad (6)$$

where TB denotes the desired number of total bits.

In an exemplary case, in which the calculation is carried out only for the luminance component Y of the video signal, where PIM(bi) for a ith block is 1, TPIM(b) is 5400, a compression rate is 1/16, a picture size is 720×480, and the bit number for each pixel is 8, the allocated bit number is obtained from equation (4) as follows:

$$B(bi) = 1/16(720 \times 480 \times 8) \times (1/5400)$$
$$= 32 \text{ bits}$$

It should be noted that when the allocated number of bits is calculated, PIM(f) can be used instead of TPIM(b) and, according to the above-described PIM theory, the following relation is obtained:

$$PIM(f) \leq TPIM(b)tm \quad (7)$$

While the allocated bit number B(bi) calculation is more precise when using TPIM(b), one frame f would have to be delayed during the initial calculation stage to obtain TPIM(b). It will be appreciated that calculation of the allocated number of bits for each block is carried out with respect to each component Y, R-Y and B-Y of the block signal sequence.

Step (e) is a coding step. The block signal sequence for each N×N block is converted into a coefficient signal sequence in accordance with a DCT algorithm, which is well-known to those of ordinary skill in the art.

The coefficient signal sequence advantageously can be quantized into a quantization coefficient sequence in accordance with a linear quantization algorithm. Preferably, a quantization step Q can be obtained when a quantization matrix QM(u,v) is multiplied by a particular value at the index of each DCT coefficient, as expressed by the following equation:

$$Q(u,v) = QM(u,v) \times 2^{-S} \quad (8)$$

where S is a scale factor.

In an exemplary case corresponding to a roughly 1.0 bits-per-pixel compression rate, the QM(u,v) matrix utilized advantageously has a value where the image quality is subjectively excellent. Different QM(u,v)

matrices can be utilized after being determined by separate experimentation, which is well within the skill of those of ordinary skill in the art, for each separate Y, R-Y, and B-Y component of the image signal sequence. Generally, the value to be utilized is one recommended by the ISO (International Organization for Standardization)/CCITT (Comité Consultatif Internationale Télégraphique et Telephonique).

Figure 3:
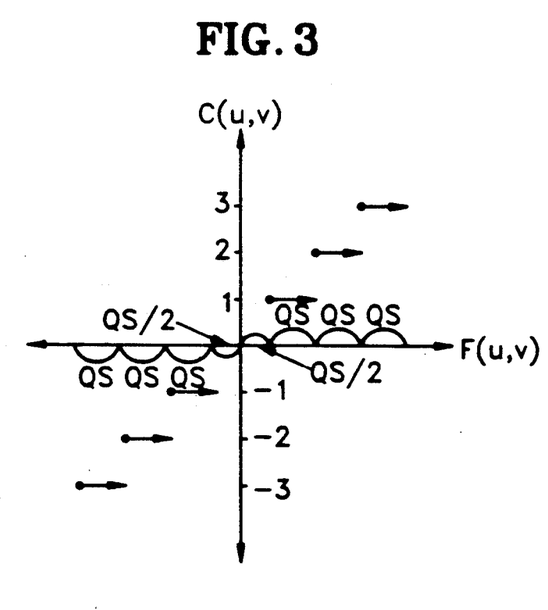
FIG. 3 is a graph showing the relationship between discrete cosine transformation (DCT) coefficients and linear quantization coefficients.

Referring to FIG. 3, if a DCT coefficient is F(u,v), a quantization value C(u,v) of the DCT coefficient can be obtained according to the expressions:

$$C(u,v) = \text{Integer}\left[\frac{F(u,v) + 1/2Q(u,v)}{Q(u,v)}\right] \quad (9)$$

when F(u,v) is greater than or equal to zero, and $$C(u,v) = \text{Integer}\left[\frac{F(u,v) - 1/2Q(u,v)}{Q(u,v)}\right] \quad (10)$$

when F(u,v) is less than zero.

It should be apparent that since quantization step Q(u,v) is adjusted in accordance with the value of scale factor S, the image quality and information amount of the coded signal sequence both vary according to the value of the scale factor S. The quantization coefficient signal sequence is then coded to obtain a coded signal sequence in accordance with a well-known variable length coding algorithm.

Step (f) is for controlling the number of bits. Although an allocated number of bits is calculated by approximation of PIM for each block, since the properties of the image signal are random, the compressed total bit number is inconsistent when using a Huffman code obtained by probability. Actually, the number of bits coded during a variable length coding process does not correspond to the number of allocated bits, thus the actual number of bits is larger or smaller than the allocated number of bits. If this process were to continue without feedback, the actual number of bits would differ greatly from the desired number of bits. To avoid this result in the method according to the present invention, the difference between the number of allocated bits and the number of actually coded bits is obtained for each block. Then, when the cumulative value of this subtraction process becomes greater than a predetermined maximum threshold, or smaller than a predetermined minimum threshold, the value of scale factor S is decreased or increased to fix the total amount of bits of the coded signal sequence to a desired number.

It should be noted that whenever the scale factor S is adjusted, scale factor S advantageously is delta-modulated and transmitted as overhead information, e.g., 1 bit per block, so that the original scale factor S can be restored when the coded signal sequence in processed by a suitable decoding system. It will also be apparent that if the value of scale factor S were abruptly changed, the distortion difference between adjacent blocks would become severe and result in degradation of image quality. Thus, any variation in the number of bits should be constrained, i.e., should be set, to be near the desired number of bits while minimizing the distortion difference between blocks. When the cumulative value becomes larger than the maximum threshold, e.g., +100 bits, since the currently set quantization step is narrow, the value of scale factor S is slightly decreased to expand the next quantization step and thereby decrease the number of coded bits. Conversely, when the cumulative value becomes smaller than the minimum threshold, e.g., −100 bits, since the currently set quantization step is wide, the value of scale factor S is slightly increased to narrow the next quantization step and, thus, increase the number of coded bits.

As described above, according to the image coding method of the present invention, the initial scale factor $S_i$ per frame is determined by calculating PIM, which corresponds to the complexity of the picture. In addition, the number of bits advantageously can be accurately allocated for each block while the number of actually coded bits can be monitored in order to provide feedback so that the difference between the number of actually coded bits and the allocated number of bits can be detected and the detected value can be accumulated. It will be appreciated that when the cumulative value deviates from a range established by predetermined maximum and minimum thresholds, the current scale factor S advantageously can be minutely adjusted at a proper time so that the information amount of the coded signal sequence corresponding to the bit rate can be fixed.

Figure 4:
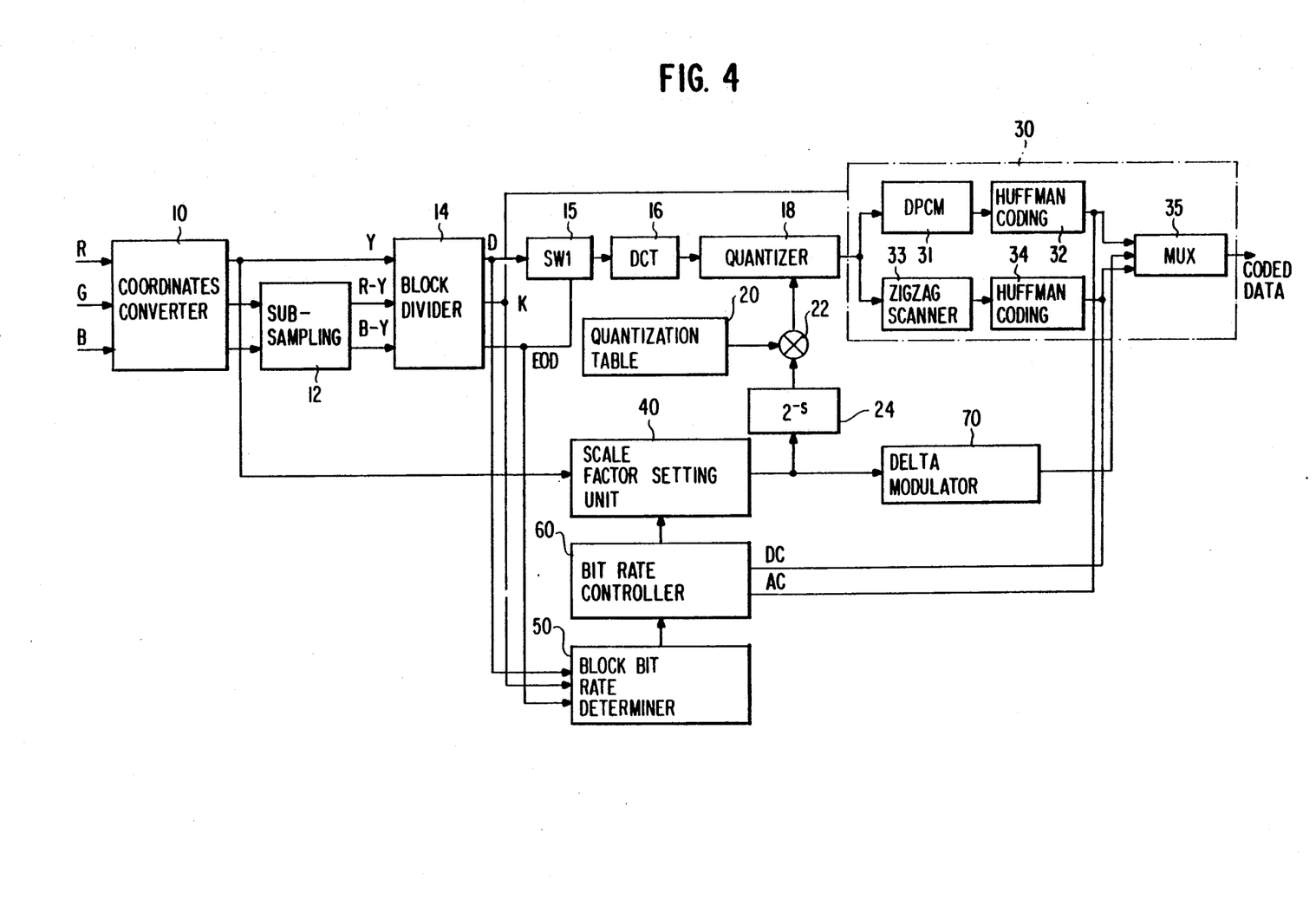
FIG. 4 is a high level block diagram showing a preferred embodiment of the image coding apparatus according to the present invention.
Figure 5A:
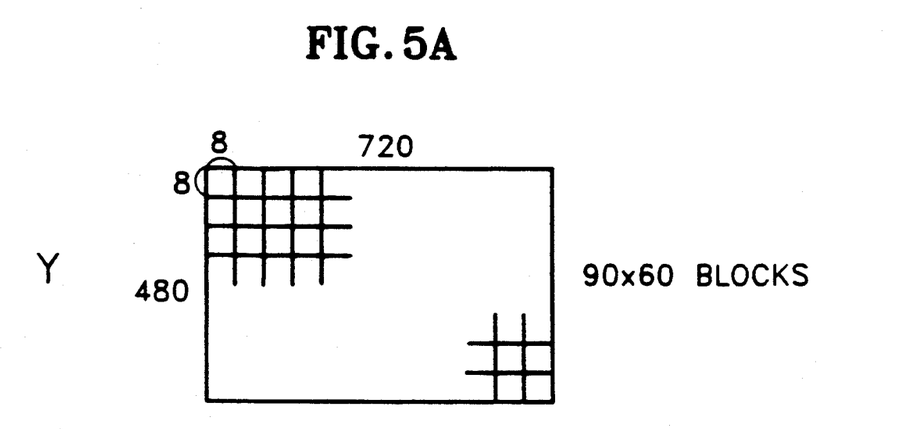
FIGS. 5A, 5B and 5C illustrate the respective block divisions of signal components Y, R-Y and B-Y produced by the block dividing unit shown in FIG. 4.
Figure 5B:
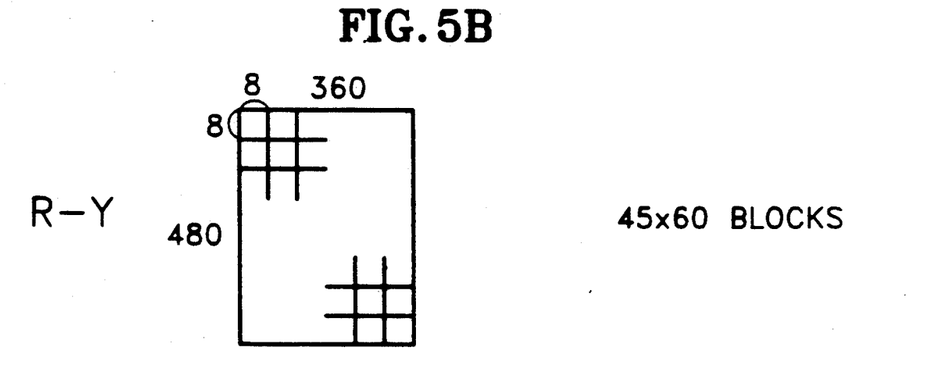
Figure 5C:
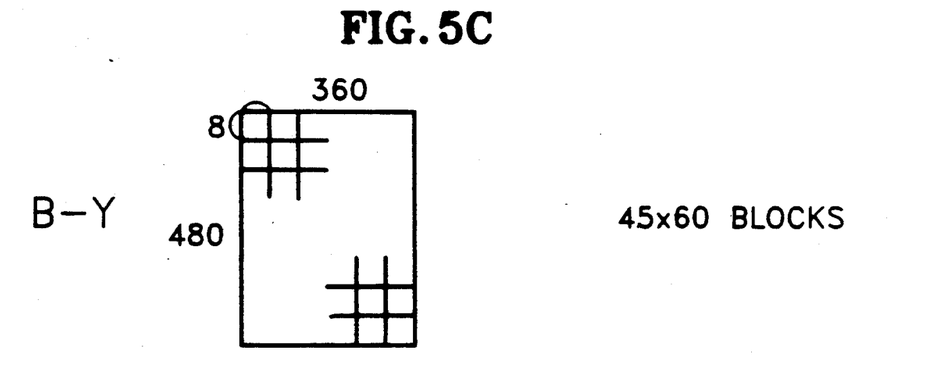

A preferred embodiment of an image coding apparatus suitable for carrying out the image coding method according to the present invention will now be described with reference to FIGS. 4–6. Referring to FIG. 4, the coordinates of the R, G and B components of a color image signal are converted in a coordinates converter 10 acting as input means. The resultant color difference signals R-Y and B-Y are provided and sub-sampled at a ratio of 2:1 in the horizontal direction in a sub-sampling unit 12. For example, as shown in FIG. 5, when the image size of luminance signal Y is 720H×480V (FIG. 5A), the size of the corresponding color difference signals R-Y (FIG. 5B) and B-Y (FIG. 5C) are each 360H×480V as a result of sub-sampling.

The luminance and color difference signals Y, R-Y and B-Y are each segmented into an N×N block of, for example, 8×8 pixels in a block divider 14. Therefore, the 720H×480V pixels of luminance signal Y can be segmented into 90×60 blocks while the of B-Y and R-Y color difference signals can each be divided into 45×60 blocks. The total number of divided blocks is 10,800.

In FIG. 4, block divider 14 generates a first control signal K for indicating respective components when they are segmented into blocks, and a second control signal EOD indicating the "end of data" when each block segment is completed. The second control signal EOD turns on a first switch for switching the data D supplied to a converter 16. Preferably, converter 16 performs DCT processing of each block in sequence, and the thus obtained DCT coefficients are linearly quantized in a quantizer 18. The quantization step size is obtained according to the index of the DCT coefficient by multiplying the quantization matrix stored in a quantization table 20 by the compression rate generated by a compressor 24 in a multiplier 22. An encoding unit 30 includes a delta pulse code modulator 31 (DPCM) for processing the DC component of the quantized coefficients according to the linear predication technique, a first coder 32 using Huffman coding, a zigzag scanner 33 for carrying out zigzag scanning of the AC components, a second coder 34 using Huffman coding, and a multiplexer 35 for summing the DC and AC components coded by first and second coders 32 and 34, and for outputting the summed result. Here, each Huffman code for the Y signal and the B-Y and R-Y signals is selected in response to first control signal K.

In FIG. 4, reference numeral 40 denotes a scale factor setting unit which calculates PIM for the frame f by receiving luminance signal Y, and in accordance with the result of that calculation, produces the initial scale factor $S_i$ corresponding to the overall complexity of the image, thereby providing the initial scale factor $S_i$ to compressor 24.

Figure 6:
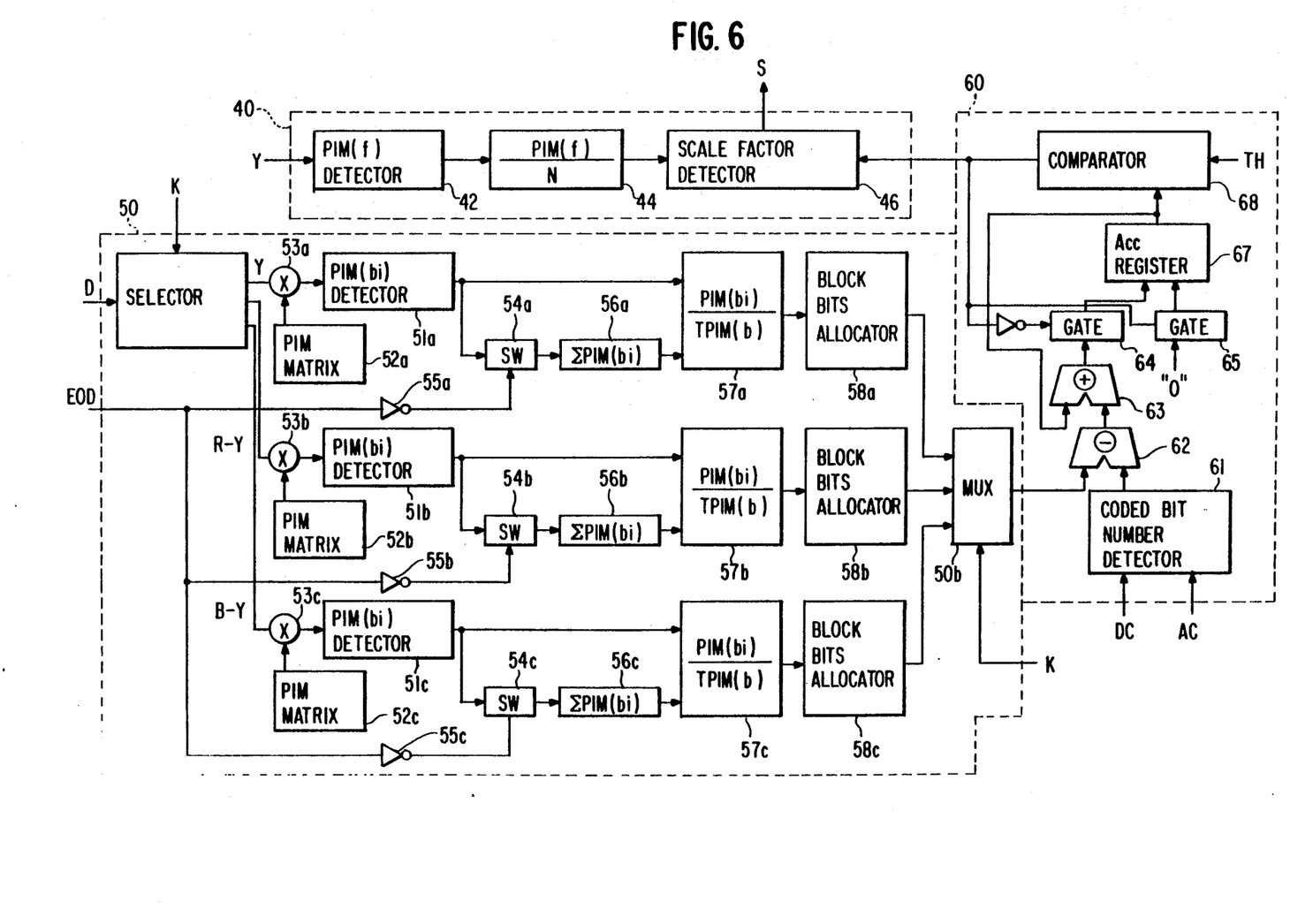
FIG. 6 is a low level block diagram of selected portions of the image coding apparatus of FIG. 4.

A more detailed description of scale factor setting unit 40 and other components of the apparatus shown in FIG. 4, is presented while referring to FIG. 6.

As shown in FIG. 6, scale factor setting unit 40 consists of a PIM frame detector 42 for detecting PIM (PIM(f)) for frames f of each picture, a normalizer 44 for obtaining normalized PIM by dividing PIM(f) by the total number of pixels, and a scale factor determiner 46 for determining the initial scale factor $S_i$ corresponding to normalized PIM(f).

Block bit rate determiner circuit 50 includes block PIM detectors 51a, 51b and 51c, PIM table units 52a, 52b and 52c, multipliers 53a, 53b and 53c, switches 54a, 54b and 54c, inverters 55a, 55b and 55c, total block PIM calculators 56a, 56b 56c, dividers 57a, 57b and 57c, and block bit allocators 58a, 58b and 58c, which advantageously cooperate for detecting PIM for each block PIM(bi) with respect to luminance signal Y and color difference signals R-Y and B-Y.

In block bit rate determined circuit 50, PIM table units 52a, 52b and 52c each store the PIM matrix corresponding to respective signal components. Multipliers 53a, 53b and 53c multiply the pixels of each block by the PIM matrix to produce linear outputs. The block PIM detectors 51a, 51b and 51c calculate PIM(bi) for each block. Switches 54a, 54b and 54c control the supply of the outputs of the multipliers 53a, 53b and 53c to the total block PIM calculators 56a, 56b and 56c. Preferably, switches 54a, 54b and 54c are switched in response to second control signal EOD of block divider 14, which signal is supplied to switches 54a, 54b and 54c via respective inverters 55a, 55b and 55c.

The switches 54a, 54b and 54c advantageously control the stream of data D to first calculate the total block TPIM(b) before carrying out DCT processing. The total block PIM calculators 56a, 56b and 56c receive block PIM(bi), add all block PIM(bi) values within one frame, and then calculate the total block TPIM(b). The dividers 57a, 57b and 57c calculate the relative ratio of each respective block PIM(bi) to total block TPIM(b) for each block, where the relative ratio indicating the complexity of each block PIM becomes the index for setting the allocated number of bits for each block. The block bit allocators 58a, 58b and 58c assign the number of bits of corresponding blocks in accordance with the outputs of dividers 57a, 57b and 57c. It will be noted that an output selector 50b is provided to selectively output the allocated number of bits in cooperation with an input selector 50a to select input block data D by components in accordance with first control signal K, which identifies each component Y, R-Y and B-Y in data D.

A bit rate controller 60 includes a bit detector 61 for detecting the block bit numbers coded in encoding unit 30, a subtracter 62 for obtaining the difference between the detected actual bit number and the allocated bit number provided by selector 50b, an adder 63 and a register 67 for accumulating the resultant subtraction, a comparator 68 for comparing the resultant cumulative value of register 67 with a predetermined threshold +TH. In addition to this, bit rate controller 60 includes a first gate 64 for providing the resultant sum in adder 63 to register 67 when comparator 68 determines that the cumulative value within register 67 is between maximum threshold +TH and minimum threshold —TH and a second gate 65 for providing a logical zero to register 67 when the resultant sum is smaller than minimum threshold —TH. The output of comparator 68 is supplied to determiner 46 of scale factor setting unit 40 as a bit-amount control signal. In other words, the output of the comparator becomes a control signal for increasing the scale factor S when the cumulative value exceeds the maximum threshold +TH. On the other hand, the output of comparator 68 becomes a control signal for decreasing the scale factor S when the cumulative value is below the minimum threshold —TH.

Referring again to FIG. 4, a delta modulator 70 generates the difference value of the scale factors between blocks. The generated difference information is added to the coded data via multiplexer 35 in response to every minute adjustment of scale factor S. It will be apparent that the difference information is utilized during decoding of the coded data.

Table 2 shows the result of compression coding of the R, G, and B signals for images which are 720×480 pixels in size and which is expressed by 16 bits per pixel, using PIM according to the present invention. In the normal mode (upper value), the compression coding is carried out using one bit per pixel. In the high definition mode (lower value), the compression coding uses two bits per pixel.

TABLE 2

| | S CONTROL SYSTEM BY PIM | | | | | |
|---|---|---|---|---|---|---|
| | Desired bit # | S | Coded bit # | SNR | | |
| Image | (Kbits) | (ave.) | (Kbits) | Y | R-Y | B-Y |
| Carnation | 337.5 | 3.46 | 337 | 40.90 | 38.77 | 39.65 |
| Girl | 675 | 4.57 | 673 | 43.47 | 39.27 | 40.48 |
| Hairband | 337.5 | 2.71 | 336 | 39.14 | 36.25 | 37.25 |
| Girl | 675 | 3.79 | 674 | 42.63 | 36.56 | 37.61 |
| Weather Forecast | 337.5 | 2.73 | 336 | 39.20 | 36.58 | 35.51 |
| | 675 | 3.93 | 675 | 43.86 | 38.26 | 38.81 |
| Swiss | 337.5 | 0.68 | 336 | 26.19 | 28.90 | 27.87 |
| Village | 675 | 1.95 | 672 | 31.89 | 29.15 | 28.08 |
| Tulip | 337.5 | 0.60 | 339 | 27.19 | 29.24 | 28.60 |
| | 675 | 2.05 | 674 | 32.34 | 30.21 | 29.37 |

As shown in Table 2, the actually coded number of bits converge on the desired number throughout the complexity range of an image from simple to complicated. It should be noted that the complexity of the images in Table 2 increase from top to bottom. It will also be noted that the signal-to-noise ratio of the image (SNR) is improved in the high definition mode as compared with that of the normal mode.

As described above, in the image coding method using PIM according to the present invention, since the number of bits can be fixed without great dependence upon the calculation of an initial scale factor $S_i$, the scale factor S can be easily calculated. It will also be appreciated that the hardware required to implement this method is easily realized.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In an image coding system for coding a digital image signal sequence into a coded signal sequence and then transmitting an amount of information of the coded signal at a fixed bit rate, an image coding method for coding an image signal sequence, said method comprising the steps of:

setting an initial quantization step size by calculation of PIM of each frame with respect to an image signal sequence for each frame;

segmenting said image signal sequence of each frame into a signal sequence including a plurality of blocks to produce a block signal sequence;

obtaining an allocated bit number of each block to be coded with respect to said fixed bit rate by calculation of block PIM for each block of said block signal sequence;

coding said block signal sequence for each block into a signal sequence coded according to said quantization step size currently set to produce a coded signal sequence;

subtracting bit numbers of said coded signal sequence for each block from said allocated bit number, and accumulating the differences; and adjusting said quantization step size currently set when said differences accumulated deviate from a previously set range.

2. The image coding method as claimed in claim 1, wherein said initial quantization step size is obtained by the following equations:

$$S = C \times [PIM(f)/N(f)];$$

and $$Q(u,v) = QM(u,v) \times 2^{-S};$$

3 where $Q(u,v)$ is a quantization step size, $QM(u,v)$ is a quantization matrix, $S$ is a scale factor, $C$ is a proportionality constant, $PIM(f)$ is activity of said frame, and $N(f)$ is number of pixels of said frame.

3. The image coding method as claimed in claim 2, wherein said adjusting step is carried out such that said scale factor is increased to reduce said quantization step size when said differences are smaller than a minimum threshold of said previously set range, and said scale factor is decreased to expand said quantization step size when said differences are larger than a maximum threshold of said previously set range.

4. The image coding method as claimed in claim 1, wherein said allocated number of bits of each block is obtained by the following equation:

$$B(bi) = TB \times [PIM(bi)/TPIM(b)]$$

where $B(bi)$ is an allocated number of bits of an ith block, $TB$ is a desired total bit number, $PIM(bi)$ is an activity of said ith block, and $TPIM(b)$ is a summation $\Sigma PIM(bi)$.

5. The image coding method as claimed in claim 1, wherein said coding step further comprises the steps of:

converting said block signal sequence into a DCT coefficient signal sequence;

quantizing said DCT coefficient signal sequence into a quantization coefficient signal sequence in accordance with said quantization step size currently set; and variable length coding said quantization coefficient signal sequence to produce said coded signal sequence.

6. The image coding method as claimed in claim 1, wherein said block signal sequence for said each block is multiplied by a PIM matrix to make a block PIM(bi) with respect to said block signal sequence of each block linearly proportional to said allocated bit number.

7. The image coding method as claimed in claim 1, wherein said scale factor is delta modulated and transmitted as additional information of said coded signal sequence.

8. An image coding apparatus comprising:

input means for receiving a digital color image signal and respectively generating a luminance component and color difference components;

sub-sampling means for sub-sampling said color difference components to produce sampled color difference components having predetermined sizes with respect to said luminance component;

block dividing means for segmenting each of said luminance component and said sampled color difference components into predetermined block units, for sequentially producing segmented block units in a block signal sequence, and for generating a first control signal for indicating whether current output data of said block signal sequence is said luminance component or one of said color difference components and a second control signal for indicating end-of-data output with respect to one frame;

converting means receiving said block signal sequence from said block dividing means for generating transform coefficients obtained by performing a discrete cosine transform operation based on said block signal sequence;

quantization means for quantizing said transform coefficients in accordance with said quantization step derived by multiplying a quantization matrix by predetermined scale factors, and for generating quantization coefficients;

encoding means for entropy coding said quantization coefficients using variable length Huffman coding, and for generating compressed data wherein the numbers of bits thereof vary by segmented block units;

setting means for determining an initial scale factor corresponding to overall activity of one frame by calculating PIM of said luminance component generated by said input means;

block bit determining means for receiving said segmented block units from said block dividing means for each block unit, and for producing an allocated number of coded bits which number corresponds to activity of each segmented block unit by calculating block PIM for each segmented block unit; and bit rate controlling means for accumulating differences between said allocated number of block bits and number of actually output bits, comparing the differences accumulated with threshold values, and minutely controlling said scale factors of said setting means to allow said number of actually output bits to converge on said allocated number of bits.

9. The image coding method as claimed in claim 8, wherein said setting means comprises:

detecting means for detecting PIM(f) of said luminance component;

normalizing means for normalizing by dividing the detected PIM(f) by a total number of pixels; and determining means for determining said initial scale factor in accordance with said normalized PIM.

10. The image coding apparatus as claimed in claim 8, wherein said block bit determining means comprises:

linearizing means receiving said block signal sequence from said block dividing means for multiplying each portion of said block signal sequence corresponding to a respective one of said luminance component and said color difference components by a corresponding weighting matrix so as to make each of said portions linearly proportional to a number of bits;

detecting means for detecting respective PIM(bi) based on each of said portions multiplied by said corresponding weighting matrix;

total block PIM calculating means for calculating a summation of PIM(bi) for one frame;

dividing means for obtaining relative complexity of each block with respect to said summation of PIM(bi) for said one frame; and block bit allocating means for assigning each block's bit number of said respective components in accordance with said relative complexity of each block determined by said dividing means.

11. The image coding apparatus as claimed in claim 10, wherein said block bit determining means comprises:

input selecting means for selectively supplying said respective portions from said block dividing means to corresponding detecting means in response to said first control signal; and output selecting means for sequentially outputting said allocated number of bits for each block of said block bit allocating means in response to said first control signal.

12. The image coding apparatus as claimed in claim 8, wherein said bit rate controlling means comprises:

detecting means for detecting number of actually output bits per each block from said encoding means;

subtracting means for obtaining respective differences between the detected number of actually output bits and said allocated number of bits assigned by said block bit determining means;

accumulating means for accumulating results from said subtracting means; and comparing means for comparing the accumulated said results of said accumulating means with predetermined threshold values, and generating a minute scale factor control signal response to that comparison.

13. An image coding system for coding a digital image signal sequence into a coded signal sequence and then transmitting an amount of information of the coded signal at a fixed bit rate, comprising:

means for setting an initial quantization step size by calculation of PIM of each frame with respect to an image signal sequence for each frame;

means for segmenting said image signal sequence of each frame into a signal sequence including a plurality of blocks to produce a block signal sequence;

means for obtaining an allocated bit number of each block to be coded with respect to said fixed bit rate by calculation of block PIM for each block of said block signal sequence;

means for coding said block signal sequence for each block into a signal sequence coded according to said quantization step size currently set to produce a coded signal sequence;

means for subtracting bit numbers of said coded signal sequence for each block from said allocated bit number, and for accumulating the differences; and means for adjusting said quantization step size currently set when said differences accumulated deviate from a previously set range.

14. The image coding system of claim 13, wherein said means for setting initial quantization step size implements the following equations:

$$S = C \times [PIM(f)/N(f)];$$

and $$Q(u,v) = QM(u,v) \times 2^{-S};$$

where $Q(u,v)$ is a quantization step size, $QM(u,v)$ is a quantization matrix, S is a scale factor, C is a proportionality constant, PIM(f) is activity of one frame, and N(f) is number of pixels of said one frame.

15. The image coding system of claim 14, wherein said means for adjusting permits said scale factor to be increased to reduce said quantization step size when said differences are smaller than a minimum threshold of said previously set range, and permits said scale factor to be decreased to expand said quantization step size when said differences are larger than a maximum threshold of said previously set range.

16. The image coding system of claim 13, wherein said means for obtaining said allocated number of bits of each block implements the following equation:

$$B(bi) = TB \times [PIM(bi)/TPIM(b)]$$

where B(bi) is an allocated number of bits of an ith block, TB is a desired total bit number, PIM(bi) is an activity of said ith block, and TPIM(b) is a summation $\Sigma PIM(bi)$.

17. The image coding system of claim 13, wherein said means for coding further comprises:

means for converting said block signal sequence into a DCT coefficient signal sequence;

means for quantizing said DCT coefficient signal sequence into a quantization coefficient signal sequence in accordance with said quantization step size currently set; and means for variable length coding said quantization coefficient signal sequence to produce said coded signal sequence.

18. The image coding system of claim 13, wherein said system further comprises means for delta modulating and transmitting said scale factor as additional information of said coded signal sequence and wherein said block signal sequence for said each block is multiplied by a PIM matrix to make a block PIM(bi) with respect to said block signal sequence of each block linearly proportional to said allocated bit number.

* * * * *